US010890460B2

United States Patent
Marzorati et al.

(10) Patent No.: US 10,890,460 B2
(45) Date of Patent: Jan. 12, 2021

(54) NAVIGATION AND LOCATION VALIDATION FOR OPTIMIZING VEHICLE-BASED TRANSIT SYSTEMS

(71) Applicant: International Business Machines Corporation, Armonk, NY (US)

(72) Inventors: Mauro Marzorati, Lutz, FL (US); Gary F. Diamanti, Wake Forest, NC (US); Jana H. Jenkins, Raleigh, NC (US); Seda Özses, Vienna (AT)

(73) Assignee: International Business Machines Corporation, Armonk, NY (US)

( * ) Notice: Subject to any disclaimer, the term of this patent is extended or adjusted under 35 U.S.C. 154(b) by 49 days.

(21) Appl. No.: 16/165,307

(22) Filed: Oct. 19, 2018

(65) Prior Publication Data

US 2020/0124434 A1    Apr. 23, 2020

(51) Int. Cl.

| | |
|---|---|
| *G01C 21/34* | (2006.01) |
| *H04W 4/024* | (2018.01) |
| *G01C 21/36* | (2006.01) |
| *G06N 3/08* | (2006.01) |

(52) U.S. Cl.
CPC ..... *G01C 21/3484* (2013.01); *G01C 21/3423* (2013.01); *G01C 21/3676* (2013.01); *G06N 3/08* (2013.01); *H04W 4/024* (2018.02)

(58) Field of Classification Search
CPC ..... G09B 29/008; H04W 4/024; G08G 1/005; G08G 1/123; B61L 15/0045; G01C 21/00; G01C 21/20; G01C 21/206; G01C 21/34; G01C 21/3415; G01C 21/3423;

(Continued)

(56) References Cited

U.S. PATENT DOCUMENTS

| | | | | |
|---|---|---|---|---|
| 6,473,790 | B1 * | 10/2002 | Tagi | G06Q 10/02 455/457 |
| 7,712,586 | B2 | 5/2010 | Legez | |
| 10,009,868 | B1 * | 6/2018 | Reyes | H04W 64/00 |

(Continued)

FOREIGN PATENT DOCUMENTS

| | | | | |
|---|---|---|---|---|
| CN | 103996222 A | | 8/2014 | |
| EP | 1258851 A2 * | | 11/2002 | G08G 1/005 |

(Continued)

OTHER PUBLICATIONS

EPO machine translation of JP 2014-238857 (original JP document published Dec. 18, 2014) (Year: 2014).*

(Continued)

*Primary Examiner* — Faris S Almatrahi
*Assistant Examiner* — David A Testardi
(74) *Attorney, Agent, or Firm* — Anthony V. England; SVL IPLaw Edell, Shapiro & Finnan, LLC (57) ABSTRACT

Methods and systems are provided for navigating to a pre-scheduled vehicle. A code is analyzed for a user including location information pertaining to the pre-scheduled vehicle, wherein the location information indicates a destination for the user. A location of the user is determined based on a GPS sensor. The user is directed to traverse a route between the location of the user and a location of the pre-scheduled vehicle. A destination of the pre-scheduled vehicle is verified as being consistent with the destination for the user indicated by the location information of the code.

19 Claims, 7 Drawing Sheets (58) Field of Classification Search
CPC .............. G01C 21/343; G01C 21/3438; G01C 21/3484; G06Q 10/047
See application file for complete search history.

(56) References Cited

U.S. PATENT DOCUMENTS

| | | | | |
|---|---|---|---|---|
| 2002/0065711 | A1* | 5/2002 | Fujisawa | G06Q 30/0601 705/13 |
| 2003/0018743 | A1* | 1/2003 | Tagi | G06Q 10/02 709/216 |
| 2003/0032436 | A1* | 2/2003 | Mikuni | G01C 21/20 455/457 |
| 2003/0058261 | A1* | 3/2003 | Challa | G06F 3/002 345/690 |
| 2004/0095260 | A1* | 5/2004 | Shintani | G08G 1/005 340/994 |
| 2007/0034107 | A1* | 2/2007 | Barbeau | G01C 21/20 104/307 |
| 2007/0288307 | A1* | 12/2007 | Mathews | G06Q 20/045 705/13 |
| 2009/0119001 | A1* | 5/2009 | Moussaeiff | G01C 21/005 701/532 |
| 2010/0063724 | A1* | 3/2010 | Arnaud | G01C 21/34 701/533 |
| 2010/0121563 | A1* | 5/2010 | Chavez | G06Q 10/08 701/533 |
| 2010/0268450 | A1* | 10/2010 | Evanitsky | G01C 21/3423 701/533 |
| 2011/0106445 | A1* | 5/2011 | Mayer | G06Q 10/06 701/533 |
| 2011/0257877 | A1* | 10/2011 | Liu | G01C 21/20 701/533 |
| 2013/0090849 | A1* | 4/2013 | Uetake | B61L 15/0045 701/522 |
| 2013/0105575 | A1* | 5/2013 | Kobres | B64F 1/366 235/382 |
| 2013/0268304 | A1 | 10/2013 | Doshi | |
| 2014/0156318 | A1 | 6/2014 | Behun et al. | |
| 2017/0069201 | A1* | 3/2017 | Sedlik | A61B 5/02055 |
| 2017/0132475 | A1* | 5/2017 | Oami | H04N 7/188 |
| 2018/0260742 | A1* | 9/2018 | Li | G06Q 10/02 |
| 2019/0327576 | A1* | 10/2019 | Nehmad | H04W 12/00 |

FOREIGN PATENT DOCUMENTS

| | | | | |
|---|---|---|---|---|
| JP | 09305889 | A * | 11/1997 | ............ G08G 1/005 |
| JP | 11037787 | A * | 2/1999 | |
| JP | 2002197151 | A * | 7/2002 | |
| JP | 2003035555 | A | 2/2003 | |
| JP | 2006276940 | A * | 10/2006 | ............ B61L 25/028 |
| JP | 2007034412 | A * | 2/2007 | |
| JP | 2009059319 | A * | 3/2009 | |
| JP | 2010152574 | A * | 7/2010 | |
| JP | 2012142776 | A * | 7/2012 | |
| JP | 2012142776 | A | 7/2012 | |
| JP | 2013152651 | A * | 8/2013 | |
| JP | 2014238857 | A * | 12/2014 | |
| WO | WO-2010015265 | A1 * | 2/2010 | ............ B61L 25/028 |

OTHER PUBLICATIONS

Aguiar, "Leveraging Electronic Ticketing to Provide Personalized Navigation in a Public Transport Network," in IEEE Transactions on Intelligent Transportation Systems, vol. 13, No. 1, pp. 213-220, Mar. 2012.

Abrams, "Amtrak Launches FindYourWay App to Help Passengers Navigate New York Penn Station." Dec. 13, 2017 https://media.amtrak.com/2017/12/amtrak-launches-findyourway-app-help-passengers-navigate-new-york-penn-station/ [Accessed Jun. 29, 2018].

Kim, 2016. "Navigating visually impaired travelers in a large train station using smartphone and bluetooth low energy." In Proceedings of the 31st Annual ACM Symposium on Applied Computing (SAC '16). ACM, New York, NY, USA, 504-611. (2016).

Goto, 2003. "Integration of electronic tickets and personal guide system for public transport using mobile terminals." In Proceedings of the 2003 ACM SIGMOD international conference on Management of data (SIGMOD '03). ACM, New York, NY, USA, 642-646, (2003).

Steves, Getting on the (Right) Train, Rich Steves' Europe, https://www.ricksteves.com/travel-tips/transportation/trains/getting-on-the-right-train, pp. 1-3, Jan. 27, 2014.

Warren, Google just showed me the future of indoor navigation, The Verge, Feb. 23, 2016, pp. 1-4.

Anonymous, QR Code, Wikipedia, https://en.wikipedia.org/wiki/QR_code, retrieved Nov. 16, 2017, pp. 1-19.

Anonymous, Anomaly Detection, Wikipedia, https://en.wikipedia.org/wiki/Anomaly_detection, retrieved Nov. 16, 2017, pp. 1-5.

Anonymous, Universally Unique Identifier, Wikipedia, https://en.wikipedia.org/wiki/Universally_unique_identifier, retrieved Nov. 16, 2017, pp. 1-10.

Anonymous, Flow to identify English Trains?, TripAdvisor, https://www.tripadvisor.com/ShowTopic-g1-i12483-k6725191-o10-How_to_identify_English_trains-Train_Travel_html, Aug. 1, 2013, pp. 1-3.

"QR codes on China's train tickets may leak personal information", Dec. 16, 2012, https://web.archive.org/web/20131212064108/http://www.wantchinatime . . . , 2 pages.

* cited by examiner

NAVIGATION AND LOCATION VALIDATION FOR OPTIMIZING VEHICLE-BASED TRANSIT SYSTEMS

BACKGROUND

1. Technical Field

Present invention embodiments relate to navigation and location validation systems and techniques, and in particular, to guiding users to a transit destination and validating the destination of the user to improve efficiency in vehicle-based transit systems.

2. Discussion of the Related Art

In modern day society, individuals may travel within their own country and/or throughout other countries for a variety of reasons, including business, vacation, and/or relocation. Navigating through transit systems in unfamiliar locations can be difficult, especially in large metropolitan areas. An individual may not know whether he/she is on the correct train, subway, bus, etc. This situation is further exacerbated for individuals traveling to a destination in which knowledge of another language is needed. Finding the correct transit connection may be confusing, and if an individual accidently boards the wrong train, it may be difficult to reverse course, especially when there are a limited number of trains or when the last train is leaving the station for that day. Missing the correct train in this situation may lead to an unplanned overnight stay.

SUMMARY

According to embodiments of the present invention, methods, systems, and computer readable media are provided for navigating to a pre-scheduled vehicle and validation of the pre-scheduled vehicle, after boarding by a user. A code for the user is analyzed by a processor to identify location information pertaining to the pre-scheduled vehicle, wherein the location information indicates a destination of the user. A location of the user is determined via a GPS sensor. The user is directed to traverse a route between the location of the user and a location of the pre-scheduled vehicle. The destination of the pre-scheduled vehicle is determined to be consistent with the destination of the user indicated by the location information of the code.

It is to be understood that the Summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE DRAWINGS

Generally, like reference numerals in the various figures are utilized to designate like components.

DETAILED DESCRIPTION

Present systems and techniques provide navigation and validation of a user for navigating to and boarding a pre-scheduled vehicle. Users may receive route information to reach the prescheduled vehicle, and upon boarding the prescheduled vehicle, may receive a notification indicating whether the correct prescheduled vehicle has been boarded. If the user has boarded an incorrect vehicle, the user may exit the vehicle.

Figure 1:
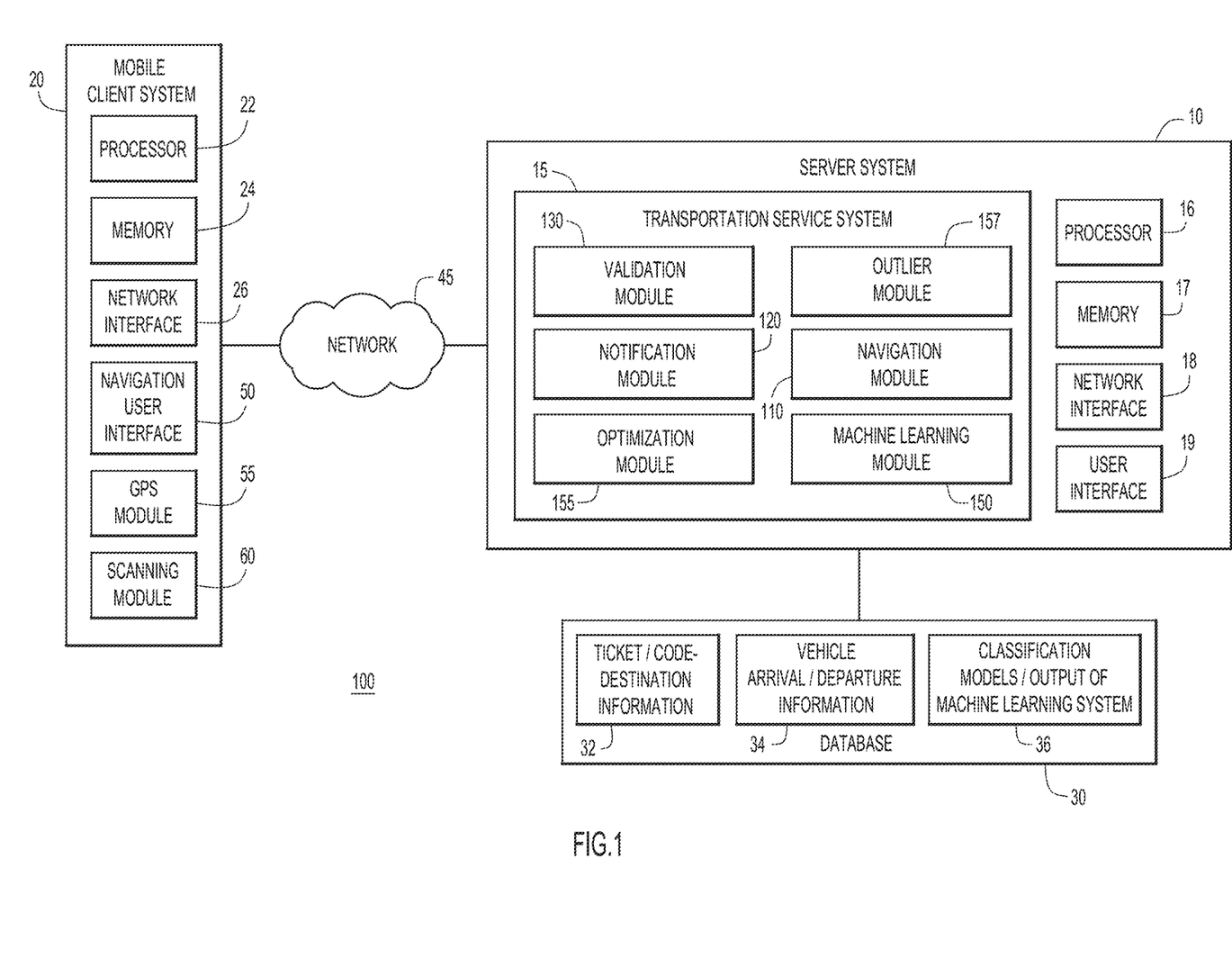
FIG. 1 is a block diagram of an example computing environment for navigation and location validation, according to embodiments of the present disclosure.

An example environment for use with present invention embodiments is illustrated in FIG. 1. Specifically, the environment includes one or more server systems 10, one or more mobile client or end-user systems 20, a database 30, and a network 45. Server systems 10 and mobile client systems 20 may be remote from each other and may communicate over network 45. The network may be implemented by any number of any suitable communications media, such as a wide area network (WAN), a local area network (LAN), Internet, Intranet, etc. Alternatively, server systems 10 and mobile client systems 20 may be local to each other, and may communicate via any appropriate local communication medium, such as local area network (LAN), hardwire, wireless link, Intranet, etc.

Mobile client systems 20 (e.g., a mobile application or wearable device), enable users to receive routes and notifications from server systems 10 for navigation to a destination via a vehicle and validation of one or more intermediate locations (e.g., transfer to another vehicle) to reach a destination. The server systems 10 may include a navigation module 110, a notification module 120, a validation module 130, a machine learning module 150, an optimization module 155, and an outlier module 157 as provided herein. A database 30 may store various information for the analysis, such as ticket/destination information 32, vehicle arrival/departure 34, classification models/output of machine learning system 36, etc. The database system may be implemented by any conventional or other database or storage unit, may be local to or remote from server systems 10 and client systems 20 and may communicate via any appropriate communication medium, such as local area network (LAN), wide area network (WAN), Internet, hardwire, wireless link, Intranet, etc. The client systems may present a graphical user interface, such as a GUI, etc., or other interface, such as command line prompts, menu screens, etc., to solicit information from users pertaining to the desired datasets and analysis, and may provide reports including analysis results, such as route information, departure time of the prescheduled vehicle, notifications regarding whether a user is traveling along a correct or incorrect route to reach a prescheduled vehicle, whether a user has boarded the prescheduled vehicle, whether a user is at the correct boarding platform, availability of seats on a vehicle, etc.

Server systems 10 and client systems 20 may be implemented by any conventional or other computer systems preferably equipped with a display or monitor, a base, optional input devices, such as, a keyboard, mouse or other input device, and any commercially available and custom software, such as server/communications software, machine learning system software, browser/interface software, etc. By way of example, the base includes at least one processor 16, 22 one or more memories 17, 24 and/or internal or external network interfaces or communications devices 18, 26 such as a modem, network cards, and a user interface 19, 50 etc. The optional input devices may include a keyboard, mouse, or other input device.

Alternatively, one or more client systems 20 may perform navigation and validation as a stand-alone device. In this mode of operation, the client system 20 stores or has access to the data, such as ticket/destination information 32, vehicle arrival/departure information 34, and classification models/output of machine learning system 36. The client system also includes the transportation service system 15 to perform the analysis. The graphical user or other navigation interface 50, such as a GUI, command line prompts, menu screens, etc., solicits information from a corresponding user pertaining to the desired analysis, and may provide reports including analysis results, such as route information, departure time of the prescheduled vehicle, notifications regarding whether a user is traveling along a correct or incorrect route to reach a pre-scheduled vehicle, whether a user has boarded the prescheduled vehicle, whether a user is at the correct boarding platform, availability of seats on a vehicle, etc.

Transportation service system 15 may include one or more modules or units to perform the various functions of present invention embodiments described herein. The various modules, such as navigation module 110, notification module 120, validation module 130, machine learning module 150, optimization module 155, outlier module 157, etc., may be implemented by any combination of any quantity of software and/or hardware modules or units, and may reside within memory 17 of the server for execution by processor 16.

Navigation module 110 may receive a code from a ticket corresponding to a user, and may access ticket/code destination information 32 to determine vehicle destination information corresponding to the code. In some cases, the ticket may contain alphanumeric information or QR codes, which may be used to look up a destination in a database. For example, ticket/destination information 32 may include data which associates an identifier (e.g., a code) with a vehicle destination. Once the destination is determined, the navigation module provides to the mobile client system 20, a route to reach a location to board the prescheduled vehicle. The navigation module 110 may communicate with the mobile client system 20 as the location of the user changes, as determined by GPS module 55, comprising a GPS sensor, to monitor the user on the route. If the user diverges from the route, a notification may be sent to the user comprising a new route to return the user to the route. Navigation module 110 may also access vehicle arrival/departure information 34 to determine the next prescheduled vehicle that a user is able to reach in a designated time period (e.g., based on a predicted walking time to the boarding platform, before the train leaves).

Notification module 120 may send notifications to the mobile client system, wherein the notifications provide an indication as to whether the location of the user is within a distance of the prescheduled vehicle, as further described below. For example, if the system determines that the user is not within a distance of the prescheduled vehicle, the transportation service system 15 will send a notification to the user. If the user is determined to be on an incorrect platform, to have boarded an incorrect vehicle, or fails to follow the correct route to reach the vehicle, the system may send a notification to the user. The notification module 120 may also provide updates to the user regarding changes in vehicle arrival/departure information 34.

Validation module 130 may send notifications to the mobile client system, indicating whether a user has boarded the prescheduled vehicle for a destination. If the user has boarded the prescheduled vehicle, the notification may confirm that the user is on the prescheduled vehicle. If the user has boarded an incorrect vehicle, the system will send a notification to the user indicating that the user is on the incorrect vehicle. In this case, the user may exit the incorrect vehicle and be redirected to the prescheduled vehicle or another prescheduled vehicle going to the same destination. Thus, validation module 130 validates that the user is on the prescheduled vehicle for the destination indicated by the code.

Machine learning module 150 may interface with outlier detection module 157 to detect outliers and/or with optimization module 155 to optimize transport of users, as described herein.

In some aspects, the system may comprise an outlier detection module 157 to determine whether a user is a member of an outlier group (see, FIGS. 4, 5A-5C). In some aspects, outlier module 157 may use a statistical classifier to determine whether a user is a member of an outlier group. In other aspects, a machine learning module 150 may be used to determine whether a user is a member of an outlier group.

In other aspects, an optimization module 155 may be used to optimize transport when users are likely to miss boarding the predetermined vehicle. In some cases, a machine learning module may provide input regarding a likelihood of a user reaching the location to board the prescheduled vehicle, which may be based on a current location of the user, a time of departure of the prescheduled vehicle, and classification of the user as a tourist or a local user. If the user is identified as likely to miss boarding the vehicle, the optimization module 155 may release and redistribute their seats to other users who are able to board the vehicle. These techniques are explained in additional detail throughout the application.

Mobile client system 20 may comprise a navigation user interface 50, a GPS module 55, and a scanning module 60. The navigation user interface 50 displays routes to a user along with other relevant data (e.g., information pertaining to vehicle departure and boarding location, etc.). The GPS module 55 determines the location of the user. The application or wearable device of the mobile client system 20 may use a location from the GPS module of the user's mobile client system to establish a location of the user and to provide detailed directions/routes to navigate the user to the correct location to board the prescheduled vehicle. This feature provides easy navigation through complex terminals, large crowded stations, or confusing platforms for new travelers or for travelers in which signs may not be in the user's native language.

The scanning module 60 allows a user to scan a ticket comprising or associated with a code or other identifier corresponding to destination information. In some aspects, the navigation and validation system may use a ticket or code to determine the transit destination of the user. When a ticket is purchased by the user (e.g., for a train, subway, plane, etc.), a barcode or QR code or other code may be associated with the ticket, which encodes the departure time/location information for the vehicle destination. This information may include the exact terminal/platform, line, and/or car/bus detail.

In some aspects, a user may opt-in or opt-out of the transportation service system 15. In some aspects, when opting out, a user may desire to keep their current location private.

Figure 2A:
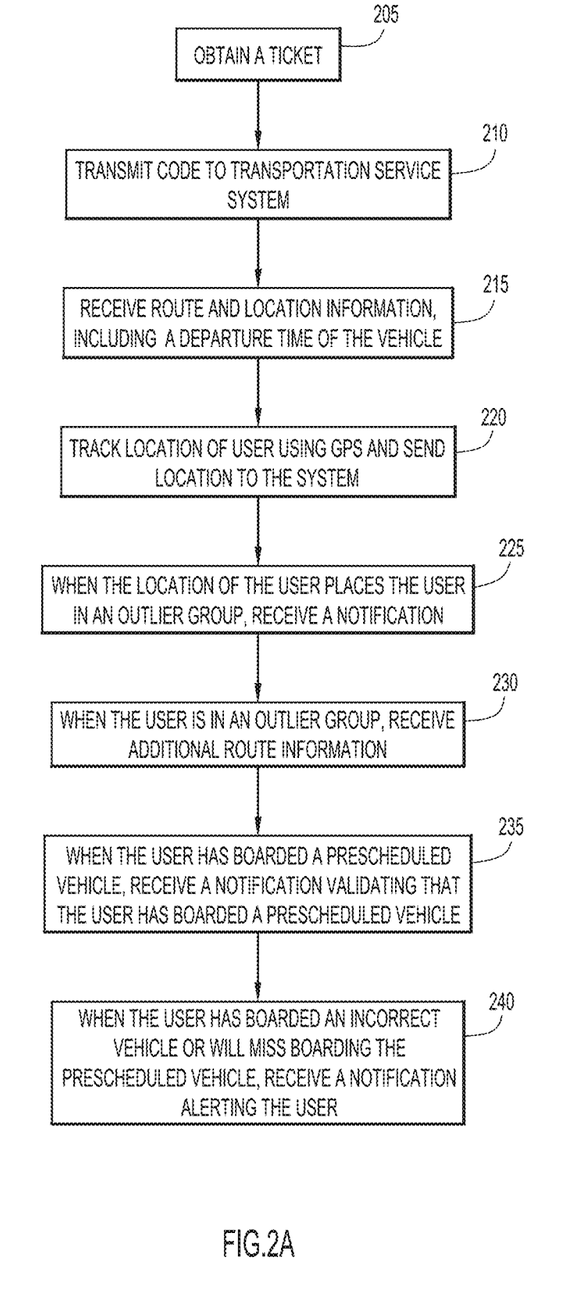
FIG. 2A is a flowchart of example mobile client operations and FIG. 2B is a flowchart of example server operations for navigation and location validation, according to embodiments of the present disclosure.

FIG. 2A is a flowchart showing example operations of a mobile client system 20. At operation 205, a user obtains a ticket comprising a code. At operation 210, the code is transmitted to transportation service system 15. At operation 215, the mobile client system receives route and location information, and may include a departure time of the vehicle. At operation 220, the mobile client system tracks the location of the user with the GPS module and sends the user location to the transportation service system 15. At operation 225, the user receives a notification from transportation service system 15, when the location of the user places the user in an outlier group. Determination of outliers are provided below. At operation 230, when the user is in an outlier group, the user receives additional route information to reach the location associated with the prescheduled vehicle. At operation 235, when the user has boarded a prescheduled vehicle, a notification is received which validates that the user is on the prescheduled vehicle. At operation 240, when the user has boarded an incorrect vehicle, or will miss boarding the prescheduled vehicle, a notification is received by the client system 20, alerting the user.

Figure 2B:
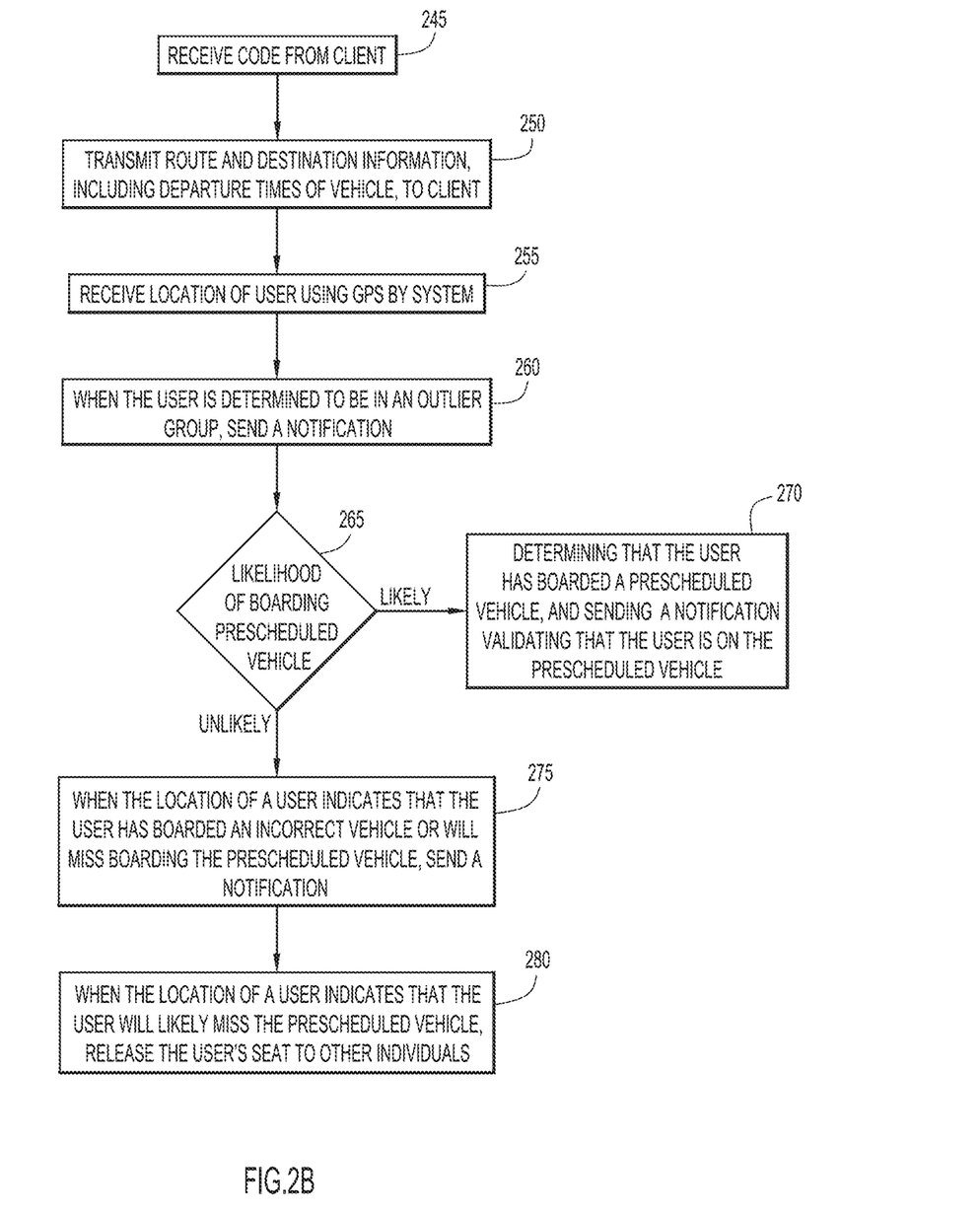

FIG. 2B is a flowchart showing example operations of a transportation service system 15. At operation 245, the system receives a code from the mobile client system. At operation 250, route and destination information are obtained based on the code and transmitted to the mobile client system, including a departure time of a prescheduled vehicle. At operation 255, the location of the user based on GPS module 55 is received by transportation service system 15. At operation 260, using the machine learning models or other statistical models, the system determines whether the user is in an outlier group. Users within an outlier group are at a higher risk of missing boarding of the prescheduled vehicle than users within a corresponding non-outlier group. Users in the outlier groups are sent a notification, indicating that he/she is at risk of missing boarding of the prescheduled vehicle. In this case, the user may also receive a notification containing route information to reach the boarding platform and timing of departure of the prescheduled vehicle. At operation 265, the system determines a likelihood of boarding a prescheduled vehicle, as explained in additional detail below, based on the location of the user, time of departure, classification of the user as a local user or tourist, etc. At operation 270, when the user is determined to have boarded a prescheduled vehicle, a notification is sent to validate that the user is on the prescheduled vehicle. At operation 275, when the user is determined to have boarded an incorrect vehicle or will miss boarding the prescheduled vehicle, a notification is sent to the user containing routing information to redirect the user to the prescheduled vehicle. At operation 280, when the user is determined to likely miss the prescheduled vehicle, the user's seat may be released to another user.

Figure 3:
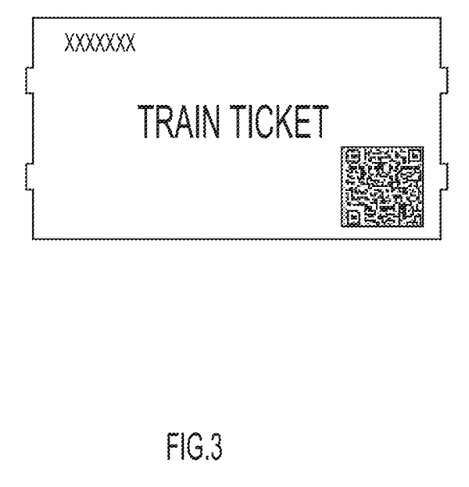
FIG. 3 is an example ticket which contains a code, according to embodiments of the present disclosure.

FIG. 3 shows an example ticket that may be purchased by a user. In some aspects, the ticket may have an identifier (e.g., a Universally Unique Identifier (UUID) or a Globally Unique Identifier (GUID), which may be in compliance with IETF RFC 4122). For example, the identifier may be a string of alphanumeric characters, such as b4d6835a-5764-4f5e-b14d-bbc022e77b28. In other embodiments, the resulting UUID/GUID is a scannable code, such as a QR code, that may be scanned into a mobile device, which is an example of client system 20. In some aspects, the UUID/GUID is associated with the user's mobile device. The user's mobile device may use the UUID/GUID to access the user's destination information in order to provide the details of the boarding location and times of the prescheduled vehicle, wirelessly to the user's device.

In some embodiments, indoor navigation assistance is provided. For example, the GPS module may transmit a vertical location to the transportation service system 15, allowing the system to determine whether the user is on an upper or lower platform for boarding a vehicle. Accordingly, the system is able to distinguish between a vehicle on an upper platform or a lower platform.

Figure 4:
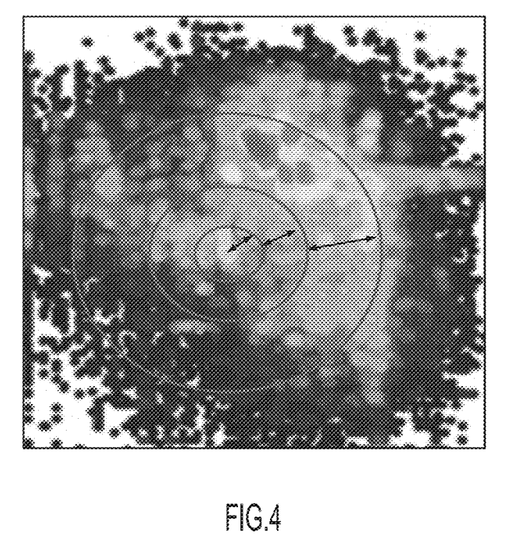
FIG. 4 shows aspects of user-based outlier detection, according to embodiments of the present disclosure.

FIG. 4 shows an example of user-based outlier detection. User-based outlier detection techniques may determine a plurality of groups of users (based on locations and groupings of user devices) within a vicinity of a user.

In some aspects, the transportation service system 15 may detect that the user is idle (not moving) for a predetermined period of time. When the user is idle, the system may determine multiple ad-hoc groupings of other mobile devices in the general vicinity of the user. The radius for each grouping may be predetermined, or may be directly proportional to the time before scheduled boarding of the prescheduled vehicle. Thus, a higher radius may correspond with a larger ad-hoc group and a smaller radius with a smaller ad-hoc group. In some aspects, the transportation service system may generate three groupings: a first grouping for near or close devices, a second grouping for intermediate devices, and a third grouping for far away devices. Examples of the radii (see arrows) to establish three ad-hoc groups are shown in FIG. 4.

Once the groupings are determined, the system may compute a belonging score of the user relative to each of the three groups in the user's current vicinity, based on any suitable outlier or anomaly detection technique, including supervised learning, clustering, dimensionality reduction, structured prediction, anomaly detection, neural nets, reinforcement leaning, machine-learning, etc. For each group, a belonging score is determined indicating a confidence that the user belongs to that group. The belonging score is indicative of the confidence that the user is not an outlier within the radius of the respective ad-hoc group. The belonging scores may be combined into a score to indicate a distance of the user from other users having a same destination. Here, the three belonging scores may be used to compute a score of how far the user is from like-travelers going to the same destination. For example, like-travelers may be grouped and scored, wherein 5 is most reliable and 0 is not reliable, according to the following travel patterns: daily (5/5), weekly (4/5), monthly (3/5), yearly (2/5), once (1/5), tourist (0/5). The higher the total score, the higher the likelihood that the user is within the correct vicinity of the prescheduled vehicle at the correct time.

In this example, it is shown that the majority of users that are to board a prescheduled vehicle are clustered near one another (within the large circle) on a boarding platform, whereas another user appears outside of this clustering (within the small circle). The system may identify outliers, or users that are not within this clustering, and may send a notification to these users based on their location. In this case, the system may determine that the user belongs with the cluster of users on the boarding platform, and the notification module may notify the user to go to the boarding platform (e.g., as represented by the cluster). In some aspects, users that are greater than a threshold distance from the boarding platform, will receive a notification, indicating that these users should proceed to the boarding platform.

In other aspects, machine learning techniques may be used to identify users which receive notifications. A training dataset may be provided to the system, listing various factors that impact travel, such as the time of day, estimated congestion, time until departure, distance from boarding platform, the location of the user, route, whether the user is a local user or a tourist, etc. The machine learning system may be trained to classify users within a group, e.g., a near group, a far group, etc., to identify users likely to miss a train based on one or more of the travel related factors. Users and their associated travel related factors may be provided to the trained machine learning system, and the user may be classified into a corresponding group. If the user is determined to be in a far away group from like-travelers, the system will send a notification to the user.

Figure 5A:
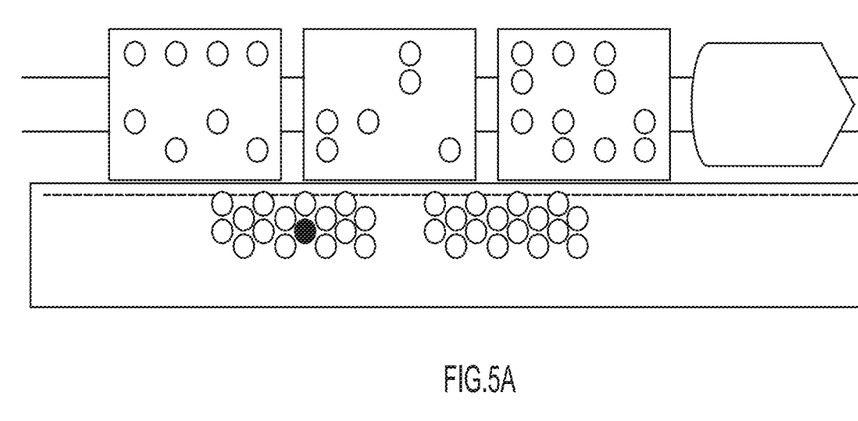
FIG. 5A shows aspects of platform-based outlier detection and FIGS. 5B-5C show aspects of conveyance-based outlier detection, according to embodiments of the present disclosure.
Figure 5B:
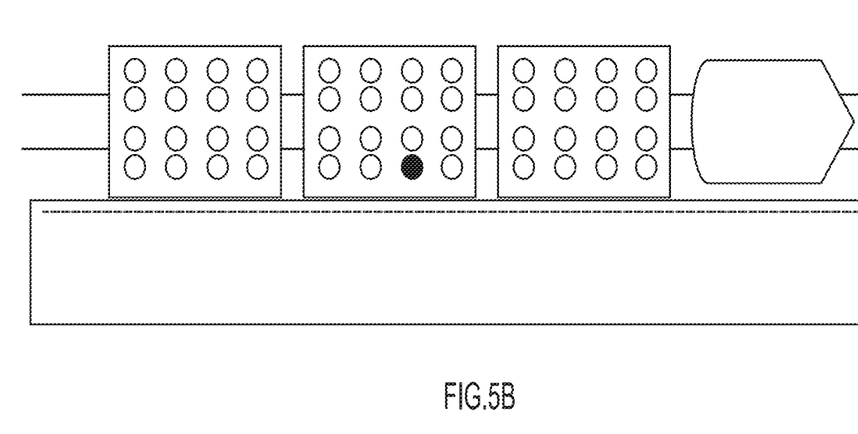
Figure 5C:
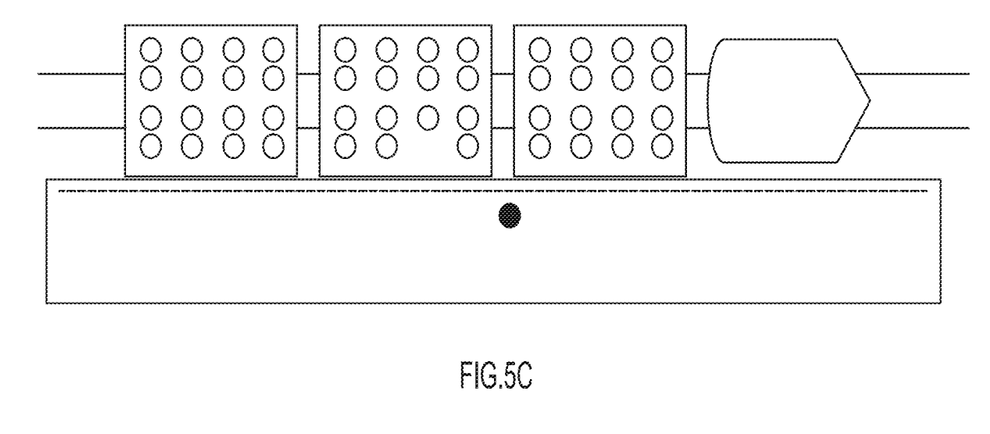

FIGS. 5A-5C show platform-based and conveyance based outlier detection according to the techniques provided herein. In aspects of platform-based outlier detection, the system may calculate a homogeneity score of each ad-hoc group derived from groupings of travelers based on radii (e.g., near or close, intermediate, and far away) relative to a defined area (e.g., the boarding platform), based on any suitable outlier or anomaly detection technique, including supervised learning, clustering, dimensionality reduction, structured prediction, anomaly detection, neural nets, reinforcement leaning, machine-learning, etc. Radii are not shown in FIGS. 5A-5C, but are determined relative to the defined area (e.g., a boarding platform). Platform-based outlier detection determines the belonging of a user in a defined area, based on the makeup of the travelers in that area.

In embodiments, the system analyses the location information and other characteristics to determine which group (e.g., majority grouping, minority grouping, or wrong platform grouping) the user likely belongs to. The majority grouping may board the next prescheduled vehicle to depart, while the minority grouping may board a subsequent prescheduled vehicle (e.g., the $2^{nd}$ or $3^{rd}$ and so forth, vehicle to depart).

Users in a minority ad-hoc grouping (within the defined area) may be evaluated to ascertain whether a vehicle at that platform is prescheduled in the near, but not immediate, future. Users in the minority grouping may have arrived at the correct platform early, or alternatively, users in the minority grouping may be present at the wrong platform. If the system cannot locate a prescheduled vehicle that the user is to board within a predefined timeframe, the user may be notified that the user is at the wrong boarding platform, and directions may be provided redirecting the user to the correct platform. On the other hand, when the prescheduled vehicle is determined to arrive at a future point in time (but is not the next vehicle to depart), minority users arriving at the platform early may be notified not to board the next vehicle because other vehicles are departing prior to their respective prescheduled vehicle. The notification may indicate whether the target vehicle (e.g., train) is the $2^{nd}$ or $3^{rd}$ or $4^{th}$ (and so forth) prescheduled vehicle to depart from the boarding platform. In some aspects, an additional notification may be sent to the minority users when the respective prescheduled vehicle arrives. As shown in FIG. 5A, the user is within a predefined area comprising a majority group scheduled to board a vehicle (e.g., in this case, a train) that is not the intended prescheduled vehicle for the user.

In still other aspects, the majority grouping, waiting at the correct platform, may receive a group notification indicating delays of the respective prescheduled train.

As an example, travelers in defined areas may be grouped into majority and minority groups and scored, wherein 5 is most reliable and 0 is not reliable, based on a destination and a departure time as follows: same destination and departure time (5/5), same destination and different departure time (3/5), same direction (2/5), different destination and different departure time (0/5). From this scoring, a total score may be computed. The higher the total score, the higher the likelihood that the user is within the correct vicinity of the preschedule vehicle (for the same destination and departure time).

FIG. 5B shows an example of conveyance-based outlier detection. In conveyance-based outlier detection, the system may determine a homogeneity score of ad-hoc groups derived from groupings of travelers, based on any suitable outlier or anomaly detection technique, including supervised learning, clustering, dimensionality reduction, structured prediction, anomaly detection, neural nets, reinforcement leaning, machine-learning, etc. This (optional) process determines the composition of travelers in a defined area, in this case, the conveyance vehicle (e.g., train or other mass transit system), similar to platform-based outlier detection. In embodiments having this feature, a notification may be triggered, e.g., when the boarding doors are opened, or within a time period of a scheduled departure. If a minority grouping or an outlier is determined to have boarded the wrong vehicle, a notification may be delivered to the user, before the boarding doors close and/or within a predetermined time period prior to departure of the prescheduled vehicle. As shown in FIG. 5C, the user may be able to depart the vehicle after boarding, when a notification indicating that the user has boarded the wrong vehicle (e.g., train), is received in time.

In other embodiments, an announcement may be made to belonging passengers on the prescheduled train that a non-belonging user is on board the train. By notifying the belonging passengers, the non-belonging user may be identified and notified by the other passengers that he/she is on the wrong train. In some aspects, the non-belonging user may be identified by a belonging passenger. In some cases, the non-belonging user may be distracted, e.g., determining whether he/she is on the correct prescheduled train. In this case, the non-belonging user may not be able to hear or check his/her mobile device. Other passenger(s) may therefore communicate to the non-belonging user that he/she is on an incorrect train.

In other aspects, a machine learning system may classify users as local users or as tourists. For example, local users may be identified based on transit pattern behavior (e.g., local users traverse a same route on a regular basis, based on analysis of images, location or other data showing trajectories and times of a user to reach a location). Local users are expected to repeat routes and traverse routes in a shorter period of time than a tourist. In cases in which the user is classified as a tourist, the system may send notifications to tourists in advance of sending notifications to the local users, to provide the tourists with additional time to respond (e.g., additional time to reach the desired location to board the prescheduled train, additional time to respond to a notification regarding whether or not to board a vehicle or depart from a vehicle).

Present techniques including optimization module 155 may also be used to improve efficiency in mass transit. Mass transit systems that contain vehicles typically have a limited number of seats, and users often purchase tickets and miss boarding the vehicle for various reasons. According to an embodiment of the invention, transportation service system 15, and in particular, optimization module 155, may predict a likelihood of whether a user will reach his/her intended location, e.g., based on whether the user is a local user or tourist, the distance that the user is from the location, and the remaining time before the vehicle departs. Especially in complex travel situations involving changes between multiple vehicles, the system may improve transit efficiency. As an example, for a user that is on a first vehicle, the system can determine whether the user is delayed (e.g., train delay, flight delay, etc.) and can predict whether the user will reach the second vehicle (e.g., for a train transfer, a connecting flight, etc.). In some aspects, when the likelihood of missing a connection is over a threshold, the user's seat may be redistributed to another user that is present at the boarding site for the vehicle. In this case, the threshold may be set high, to ensure that false positives are rare.

In other aspects, and for a plurality of users having a likelihood of missing the vehicle, the system may release a predetermined amount of seats (a fraction of the available seats) to other users present at the boarding site for the vehicle. In some cases, the machine learning module 150 may be used to predict users likely to miss boarding of the vehicle, and whether or not to release those seats to other users. For example, by training the machine model to identify users likely to miss boarding the vehicle, the system may release the seats or a portion thereof to other users to improve efficiency of user transit. In some cases, due to monitoring the user in real-time, the system may release seats to other users as soon as it is determined that the user has missed boarding the vehicle.

In other aspects, the group of users likely to miss the vehicle may be treated as a population of users, with some users reaching the boarding site and others not reaching the boarding site. Thus, by analyzing population demographics of this group, the system may determine how many seats to release to other users. Accordingly, present techniques improve transit efficiency in mass transit and/or other vehicle-based systems.

Figure 6:
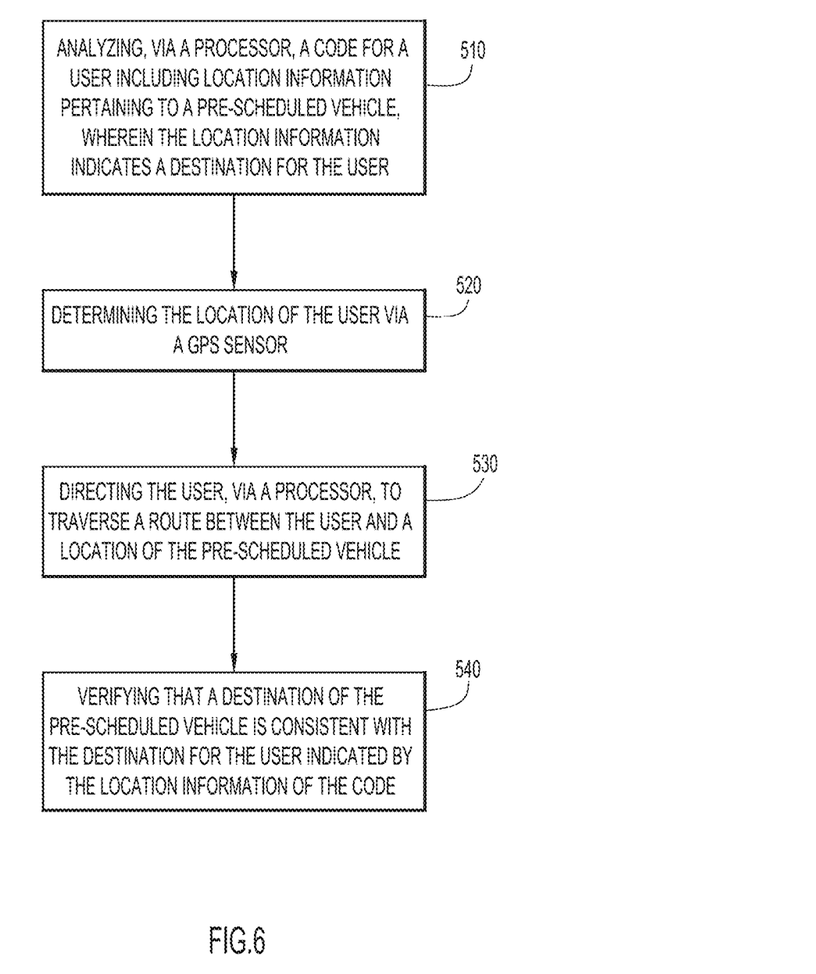
FIG. 6 is a flowchart of example operations for navigation and location validation, according to embodiments of the present disclosure.

FIG. 6 shows example high level operations of navigation and validation systems. At operation 510, a code for a user is analyzed including location information pertaining to a pre-scheduled vehicle, wherein the location information indicates a destination for the user. At operation 520, the location of the user via a GPS sensor is determined. At operation 530, the user is directed, via a processor, to traverse a route between the user and a location of the pre-scheduled vehicle. At operation 540, the system verifies that a destination of the pre-scheduled vehicle is consistent with the destination for the user indicated by the location information of the code.

The present techniques offer multiple advantages over other conventional navigation techniques. For example, the system may predict whether a user is likely to miss boarding the prescheduled vehicle. The system may provide additional route information to redirect the user to the prescheduled vehicle. If the prescheduled vehicle cannot be reached within the time period, the system may release the user's seat to another user. These operations improve the efficiency of mass transit and in particular, vehicle-based systems.

These techniques may be extended to multiple connections and complex switching, which may occur in mass transit. By scanning the barcode and/or QR code or other code, the application/wearable device can determine whether a user has boarded the prescheduled vehicle or correct series of prescheduled vehicles based on the GPS location of the user.

These techniques provide for improvements in real-time navigation, tracking of individual users, and tracking patterns of users. Real-time navigation allows the system to not only guide a user to an intended destination in real-time, but also, to manage transportation processes in real-time. When the transportation service system predicts that one or more users will likely miss a designated vehicle, the system may compensate by releasing at least a portion of these available seats to other passengers. Present techniques may reduce the number of missed vehicles, as users receive one or more notifications of where they should be relative to the boarding/departure time of the vehicle. Additionally, such techniques provide for the ability to track users, both in terms of location and patterns of movement. For example, if a user is determined to have taken a wrong path, the system can redirect the user to the correct path to reach the vehicle. Additionally, the system may track patterns of users to assign these users to groups, as well as identify users that may have been assigned to an incorrect group. If the system determines that a region has become congested, due to a high volume of users, the system may reroute the user along a different path in order to reach the destination at the desired time. Further, with the real-time system, any delays, boarding platform changes, or other last minute changes may be conveyed to the users to maximize the amount of time to board the prescheduled vehicle.

It will be appreciated that the embodiments described above and illustrated in the drawings represent only a few of the many ways of implementing embodiments for improving the performance of transit systems, including bus, train, air, boat, etc. These embodiments may apply generally to scenarios involving reaching a destination at a specified time (e.g., appointments, etc.).

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, transportation service system transportation service system 15, scanning module 60, GPS module 55 and navigation user interface 50, etc.). These systems may include any types of monitors and input devices (e.g., keyboard, mouse, voice recognition, etc.) to enter and/or view information.

It is to be understood that the software (e.g., transportation service system module 15, including navigation module 110, notification module 120, validation module 130, machine learning module 150, optimization module 155 and outlier module 157, as well as scanning module 60, GPS module 55, and navigation user interface 50, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., transportation service system module 15, including navigation module 110, notification module 120, validation module 130, machine learning module 150, optimization module 155, and outlier module 157, scanning module 60, GPS module 55, and navigation user interface 50, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), wireless link, Intranet, etc.).

The system may employ any number of any conventional or other databases, data stores or storage structures (e.g., files, databases, data structures, data or other repositories, etc.) to store information (e.g., ticket/destination information 32, vehicle arrival/departure 34, classification models and output of machine learning system 36 (classified data), etc.). The database system may be implemented by any number of any conventional or other databases, data stores or storage structures (e.g., files, databases, data structures, data or other repositories, etc.) to store information (e.g., ticket/destination information 32, vehicle arrival/departure information 34, classification models and output of machine learning system 36, etc.). The database system may be included within or coupled to the server and/or client systems. The database systems and/or storage structures may be remote from or local to the computer or other processing systems, and may store any desired data (e.g., ticket/destination information 32, vehicle arrival/departure information 34, classification models and output of machine learning system 36, etc.).

The present invention embodiments may employ any number of any type of user interface (e.g., Graphical User Interface (GUI), command-line, prompt, etc.) for obtaining or providing information (e.g., ticket/destination information 32, vehicle arrival/departure information 34, classification models and output of machine learning system 36, etc.), wherein the interface may include any information arranged in any fashion. The interface may include any number of any types of input or actuation mechanisms (e.g., buttons, icons, fields, boxes, links, etc.) disposed at any location to enter/display information and initiate desired actions via any suitable input devices (e.g., mouse, keyboard, etc.). The interface screens may include any suitable actuators (e.g., links, tabs, etc.) to navigate between the screens in any fashion.

The output of the transportation service system 15 may include any information arranged in any fashion, and may be configurable based on rules or other criteria to provide desired information to a user (e.g., routes, notifications, validations, likelihood of reaching a destination, etc.).

The present invention embodiments are not limited to the specific tasks or algorithms described above, but may be utilized for any application in which reaching a destination at a desired time is useful.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of navigating to a pre-scheduled vehicle comprising:
   analyzing, via a processor, a scannable code for a user including location information pertaining to the pre-scheduled vehicle, wherein the location information indicates a destination for the user;

determining a location of the user via a GPS sensor;
directing the user, via a processor, to traverse a route between the user and a location of the pre-scheduled vehicle; and
verifying that a destination of the pre-scheduled vehicle is consistent with the destination for the user indicated by the location information of the scannable code, wherein verifying the destination further comprises:
determining, based on locations of mobile devices of other users, a plurality of groups of the other users in the vicinity of the user, wherein a radius of a respective group is proportional to a time to boarding;
determining a score for each group indicating a confidence that the user belongs to that group;
verifying the destination of the pre-scheduled vehicle based on a cluster of other users that are to board the pre-scheduled vehicle; and indicating, based on a combination of the scores, a distance of the user from the other users having a same destination as the user, wherein the combination determines which group the user belongs to and the distance is determined by the radius of the group to which the user belongs.

2. The method of claim 1, wherein the pre-scheduled vehicle includes a train, the code is provided on a ticket for the train, and the location information of the code includes a departure time and a departure location for the train.

3. The method of claim 2, wherein the code includes one of a bar code and a QR code.

4. The method of claim 1, wherein verifying the destination of the pre-scheduled vehicle comprises:
determining a plurality of groups of users within an area proximate the location for the pre-scheduled vehicle;
identifying that the user is within a minority group of the plurality of groups;
determining an expected time of arrival for a next pre-scheduled vehicle; and
notifying the minority group of an inconsistent destination in response to the time of arrival exceeding a predetermined time period.

5. The method of claim 1, herein verifying the destination of the pre-scheduled vehicle comprises:
determining a plurality of groups of users within the pre-scheduled vehicle;
identifying that the user is within an outlier group based on destinations for the plurality of groups of users; and
notifying the outlier group of an inconsistent destination.

6. The method of claim 1, further comprising: utilizing machine learning to determine a likelihood of whether the user will board the pre-scheduled vehicle prior to departure.

7. The method of claim 1, wherein a machine learning system determines whether a user is a local user that traverses the route on a regular basis or a tourist, and the method further comprising:
sending notifications to a mobile client system of a user determined to be a tourist before sending notifications to a mobile client system of a user determined to be a local user.

8. A system for navigating to a pre-scheduled vehicle comprising at least one processor configured to:
analyze a scannable code for a user including location information pertaining to the prescheduled vehicle, wherein the location information indicates a destination for the user;
determine a location of the user via a GPS sensor;
direct the user to traverse a route between the user and a location of the pre-scheduled vehicle; and
verify that a destination of the pre-scheduled vehicle is consistent with the destination for the user indicated by the location information of the scannable code, wherein verifying the destination further comprises:
determining, based on locations of mobile devices of other users, a plurality of groups of the other users in the vicinity of the user, wherein a radius of a respective group is proportional to a time to boarding;
determining a score for each group indicating a confidence that the user belongs to that group;
verifying the destination of the pre-scheduled vehicle based on a cluster of other users that are to board the pre-scheduled vehicle; and indicating, based on a combination of the scores, a distance of the user from the other users having a same destination as the user, wherein the combination determines which group the user belongs to and the distance is determined by the radius of the group to which the user belongs.

9. The system of claim 8, wherein the pre-scheduled vehicle includes a train, the code is provided on a ticket for the train, and the location information of the code includes a departure time and a departure location for the train.

10. The system of claim 9, wherein the code includes one of a bar code and a QR code.

11. The system of claim 8, wherein the at least one processor is further configured to:
determine a plurality of groups of users within an area proximate to the location for the pre-scheduled vehicle;
identify that the user is within a minority group of the plurality of groups;
determine an expected time of arrival for a next pre-scheduled vehicle; and
notify the minority group of an inconsistent destination in response to the time of arrival exceeding a predetermined time period.

12. The system of claim 8, wherein the at least one processor is further configured to:
determine a plurality of groups of users within the pre-scheduled vehicle;
identify that the user is within an outlier group based on destinations for the plurality of groups of users; and
notify the outlier group of an inconsistent destination.

13. The system of claim 8, wherein a machine learning module determines a likelihood of whether the user will board the pre-scheduled vehicle prior to departure.

14. The system of claim 8, wherein a machine learning module determines whether a user is a local user that traverses the route on a regular basis or a tourist, and wherein the processor is further configured to send notifications to a mobile client system of a user determined to be a tourist before sending notifications to a mobile client system of a user determined to be a local user.

15. A computer program product for navigating to a prescheduled vehicle, the computer program product comprising one or more computer readable storage media collectively having program instructions embodied therewith, the program instructions executable by a processor to:
analyze a scannable code for a user including location information pertaining to the prescheduled vehicle, wherein the location information indicates a destination for the user;
determine a location of the user via a GPS sensor;
direct the user to traverse a route between the user and a location of the pre-scheduled vehicle; and
verify that a destination of the pre-scheduled vehicle is consistent with the destination for the user indicated by the location information of the scannable code, wherein verifying the destination further comprises:

determining, based on locations of mobile devices of other users, a plurality of groups of the other users in the vicinity of the user, wherein a radius of a respective group is proportional to a time to boarding;

determining a score for each group indicating a confidence that the user belongs to that group;

verifying the destination of the pre-scheduled vehicle based on a cluster of other users that are to board the pre-scheduled vehicle; and indicating, based on a combination of the scores, a distance of the user from the other users having a same destination as the user, wherein the combination determines which group the user belongs to and the distance is determined by the radius of the group to which the user belongs.

16. The computer program product of claim 15, wherein the pre-scheduled vehicle includes a train, the code is provided on a ticket for the train, and the location information of the code includes a departure time and a departure location for the train, and wherein the code includes one of a bar code and a QR code.

17. The computer program product of claim 15, wherein the program instructions are executable to:

determine a plurality of groups of users within an area proximate to the location for the pre-scheduled vehicle;

identify that the user is within a minority group of the plurality of groups;

determine an expected time of arrival for a next pre-scheduled vehicle; and notify the minority group of an inconsistent destination in response to the time of arrival exceeding a predetermined time period.

18. The computer program product of claim 15, wherein the program instructions are executable to determine a likelihood based on machine learning of whether the user will board the prescheduled pre-scheduled vehicle prior to departure.

19. The computer program product of claim 15, wherein the program instructions are executable to determine, using machine learning, whether a user is a local user that traverses the route on a regular basis or a tourist, and wherein the processor is further configured to send notifications to a mobile client system of a user determined to be a tourist before sending notifications to a mobile client system of a user determined to be a local user.

* * * * *